United States Patent
Shivaswamy et al.

(10) Patent No.: US 12,456,140 B2
(45) Date of Patent: Oct. 28, 2025

(54) SYSTEM, METHOD, AND COMPUTER STORAGE MEDIA FOR EMPLOYING USER ACTIVITY DATA OF VARIANTS FOR IMPROVED SEARCH

(71) Applicant: eBay Inc., San Jose, CA (US)

(72) Inventors: Gurudatta Horantur Shivaswamy, Saratoga, CA (US); Linyin Wu, Cupertino, CA (US); Manish Harshad Shah, Milpitas, CA (US); Atcharavan Vajarapong, San Jose, CA (US); Xiaoyuan Wu, Shanghai (CN); Jingying Wang, Shanghai (CN); Maoquan Wang, Shanghai (CN); Yuyangzi Fu, Nantong (CN)

(73) Assignee: eBay Inc., San Jose, CA (US)

( * ) Notice: Subject to any disclaimer, the term of this patent is extended or adjusted under 35 U.S.C. 154(b) by 662 days.

(21) Appl. No.: 16/864,580

(22) Filed: May 1, 2020

(65) Prior Publication Data
US 2021/0342915 A1    Nov. 4, 2021

(51) Int. Cl.
*G06Q 30/06* (2023.01)
*G06F 16/2457* (2019.01)
(Continued)

(52) U.S. Cl.
CPC ... *G06Q 30/0631* (2013.01); *G06F 16/24578* (2019.01); *G06F 16/9535* (2019.01); *G06Q 30/0621* (2013.01)

(58) Field of Classification Search
CPC ........................... G06Q 30/06; G06Q 30/0631
See application file for complete search history.

(56) References Cited

U.S. PATENT DOCUMENTS 7,890,528 B1 *   2/2011   Khoshnevisan ...... G06F 16/951
                                                    707/769
9,672,552 B2    6/2017   Warren et al.
(Continued)

FOREIGN PATENT DOCUMENTS

| CN | 103020240 A | 4/2013 |
| CN | 109416697 A | 3/2019 |
| KR | 10-1922252 B1 | 11/2018 |

OTHER PUBLICATIONS

Chaudhuri, Sougata. "Ranking and Calibrating Click-Attributed Purchases in Performance Display Advertising". In Proceedings of the ADKDD'17 (ADKDD'17). Association for Computing Machinery, New York, NY, USA, Article 7, 1-6. (2017). https://doi.org/10.1145/3124749.3124755.*

(Continued)

*Primary Examiner* — Jeffrey A. Smith
*Assistant Examiner* — Jennifer V Lee
(74) *Attorney, Agent, or Firm* — Shook, Hardy & Bacon L.L.P.

(57) ABSTRACT

A first variant of a listing and a second variant of the listing are received. The listing describes an item for sale in an electronic marketplace. The first variant describes a different iteration of the item relative to the second variant. First user activity data of the first variant is generated and second user activity data of the second variant is generated. The first user activity data corresponds to user input metrics associated with the first variant. The second user activity data corresponds to user input metrics associated with the second variant. A search engine receives a first query. Based at least in part on the first user activity data relative to the second user activity data, a first search result associated with the first variant is ranked higher than a second search result associated with the second variant.

21 Claims, 9 Drawing Sheets

(51) Int. Cl.
  *G06F 16/9535* (2019.01)
  *G06Q 30/0601* (2023.01)

(56) References Cited

U.S. PATENT DOCUMENTS

| | | | |
|---|---|---|---|
| 10,354,337 B2 | 7/2019 | England et al. | |
| 2010/0262596 A1 | 10/2010 | Dumon et al. | |
| 2011/0106594 A1* | 5/2011 | Shirey | G06Q 30/02 707/723 |
| 2013/0179218 A1 | 7/2013 | Rehman et al. | |
| 2017/0371953 A1 | 12/2017 | Kanjilal et al. | |

OTHER PUBLICATIONS

Communication Pursuant to Article 94(3) EPC received for European Patent Application No. 21171399.5, mailed on Aug. 2, 2023, 6 pages.
Office action received for Korean Patent Application No. 10-2023-0048888, mailed on Nov. 22, 2023, 11 pages (5 pages of Original OA and 6 pages of English Translation).
Notice of Allowance received for Korean Patent Application No. 10-2023-0048888, mailed on Jul. 24, 2024, 8 pages (3 pages of English Translation and 5 pages of Original Document).
Office action received for Chinese Patent Application No. 202110427626.0, mailed on Jun. 26, 2024, 30 pages (15 pages of Original OA and 15 pages of English Translation).
Notice of Allowance received for Chinese Patent Application No. 202110427626.0, mailed on Dec. 23, 2024, 6 pages (4 pages of original copy and 2 pages of English Translation).
Extended European Search Report received for European Patent Application No. 21171399.5, mailed on Sep. 24, 2021, 9 pages.
Office Action received for Korean Patent Application No. 10-2021-0043255, mailed on Jul. 18, 2022, 14 Pages (1 Page of English translation and 13 Pages of Official Copy).
Notice of Allowance received for Korean Patent Application No. 10-2021-0043255, mailed on Jan. 13, 2023, 5 Pages(Official Copy only).

* cited by examiner

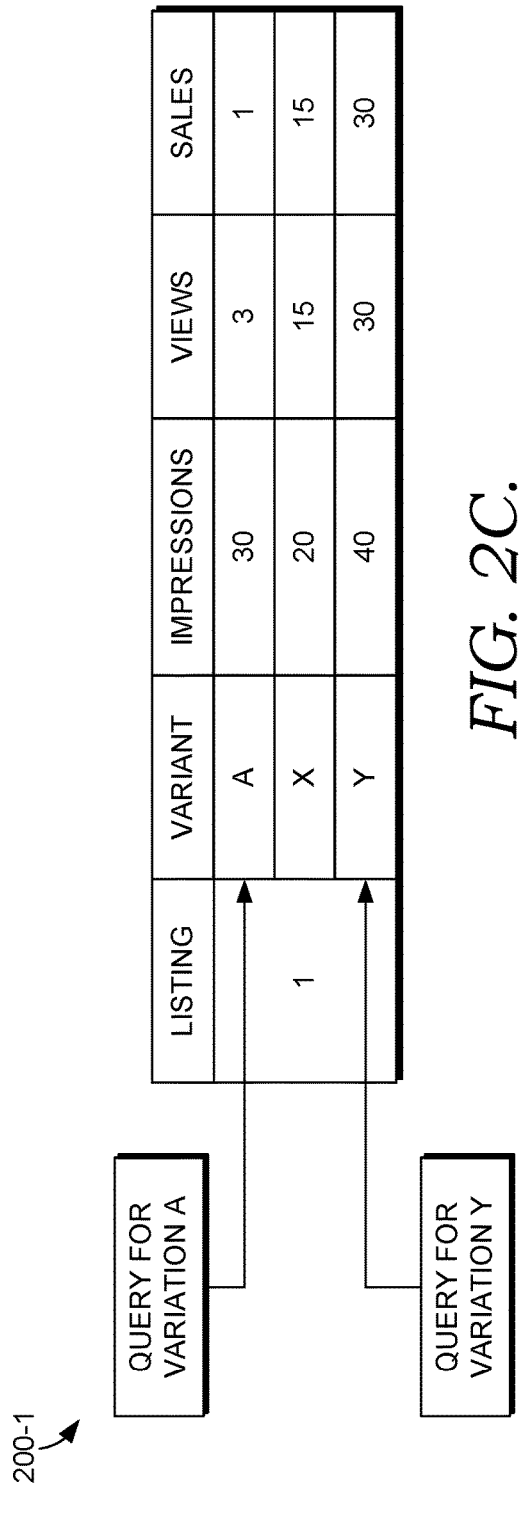
*FIG. 2C.*
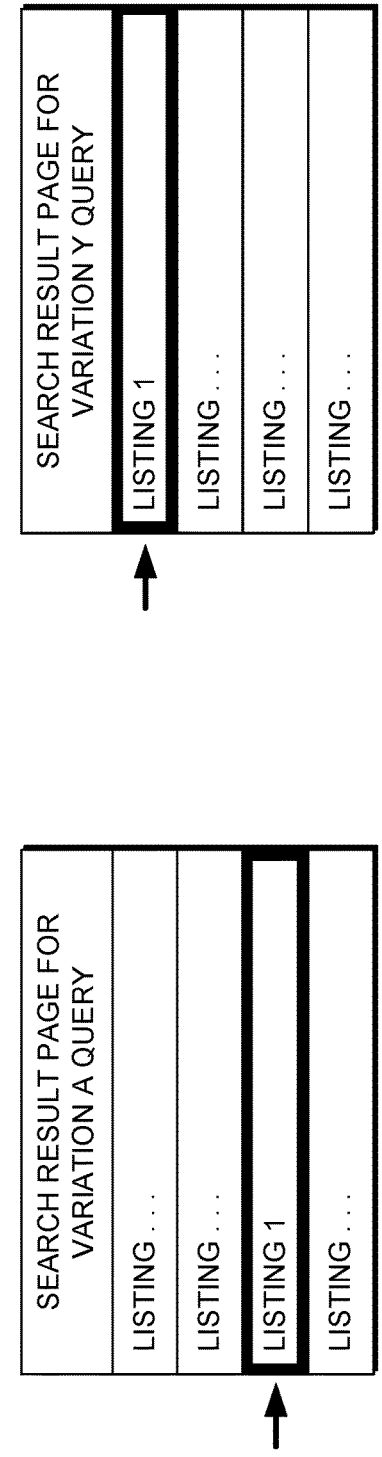
*FIG. 2E.*
*FIG. 2D.*

| | | |
|---|---|---|
| RankBy | Relevance ⇕ | Query | Brand A White sneakers | Search |
| | | 411 |

| Image | Title | Price |
|---|---|---|
| 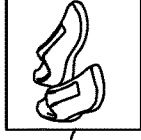 | Brand A Shoes Men's Size 9.5 Air Basketball 2003 New Vintage (322662755683) (15709) | 103.96 |
| 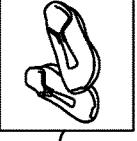 | Brand A Men's Size 14 Air Versatile II Basketball Sneakers Shoes F2-358 (273489046105) (15709) | 44.99 |
| 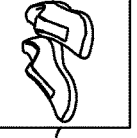 | Brand A Air - Men's Size 12 – Vintage – Basketball footwear / footwear – unused (273465351326) (15709) | 25.00 |
| 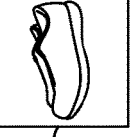 | Brand A Men's White Athletic Basketball hightop Size 13 EUC 315134-130 (232933117186) (15709) | 49.95 |
|  | Brand A Revolution 3 University Red Mens Running Sneakers Shoes 819300-601 (273370948177) (15709) | 46.95 |

SYSTEM, METHOD, AND COMPUTER STORAGE MEDIA FOR EMPLOYING USER ACTIVITY DATA OF VARIANTS FOR IMPROVED SEARCH

BACKGROUND

Users typically input one or more search terms as a query within a field of a search engine in order to receive information particular to the query. For example, after launching a web browser, a user can input search engine terms to request a particular item (e.g., a document, a link, a web page, a listing that describes a product for sale, etc.). One or more servers hosting the search engine logic can obtain data from various data sources, rank search results associated with the particular item, and cause a web page or app page to display various ranked search results associated with the particular item. The user may then select one or more of the various ranked result identifiers.

Search engine logic may use item metrics as signals in search ranking algorithms. For example, in e-commerce or other online platforms where products are for sale, search ranking algorithms may rank more popular listings higher than less popular listings. In some situations, a single listing has multiple variants. A "variant" is a particular iteration, instance, or sub-category of an item. For example, a Multi-Stock-Keeping Unit (MSKU) is a unique identifier that refers to a specific listing or product (e.g., a t-shirt) that has multiple variants (e.g., colors, sizes, etc.). Each variant of the listing has the same MSKU even though it may be slightly different than other variants or the listing it belongs to. In the MSKU and other contexts where listings that have variants are used for search ranking, existing search technologies are deficient in terms of functionality, accuracy, and computer resource consumption, as described in more detail herein.

BRIEF SUMMARY

Particular embodiments of the present disclosure include a computer-implemented method, a non-transitory computer storage medium, and a system. Some aspects are directed to improving search technologies by intelligently generating user activity data for each variant of an item and ranking each corresponding listing (and/or variant) based at least in part on the user activity data of each individual variant, as opposed to user activity data of the entire listing, which improves the accuracy, functionality, and computing resource consumption, among other things relative to other search technologies. Other advantages, embodiments, improvements and the like are described herein.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

The present technology is described in detail below with reference to the attached drawing figures, wherein:

FIG. 2C is a schematic diagram illustrating the user activity data for the first listing of FIG. 2A, except that two different queries are issued for two different variations of the same listing, according to particular embodiments.

FIG. 2D illustrates a search result page indicating that the listing of FIG. 2C is ranked low relative to other listings because the variation A user activity data and its counts are lower than related user activity data of other listings, according to particular embodiments.

FIG. 2E illustrates that the same listing of FIG. 2C can be promoted or ranked to a higher positioning within its respective search result page relative to its positioning within the search result page of FIG. 2D, according to particular embodiments.

FIG. 4A is a screenshot of an example user interface depicting a search result page rendered at a first time in response to a user issuing a query, according to particular embodiments.

DETAILED DESCRIPTION

Figure 1:
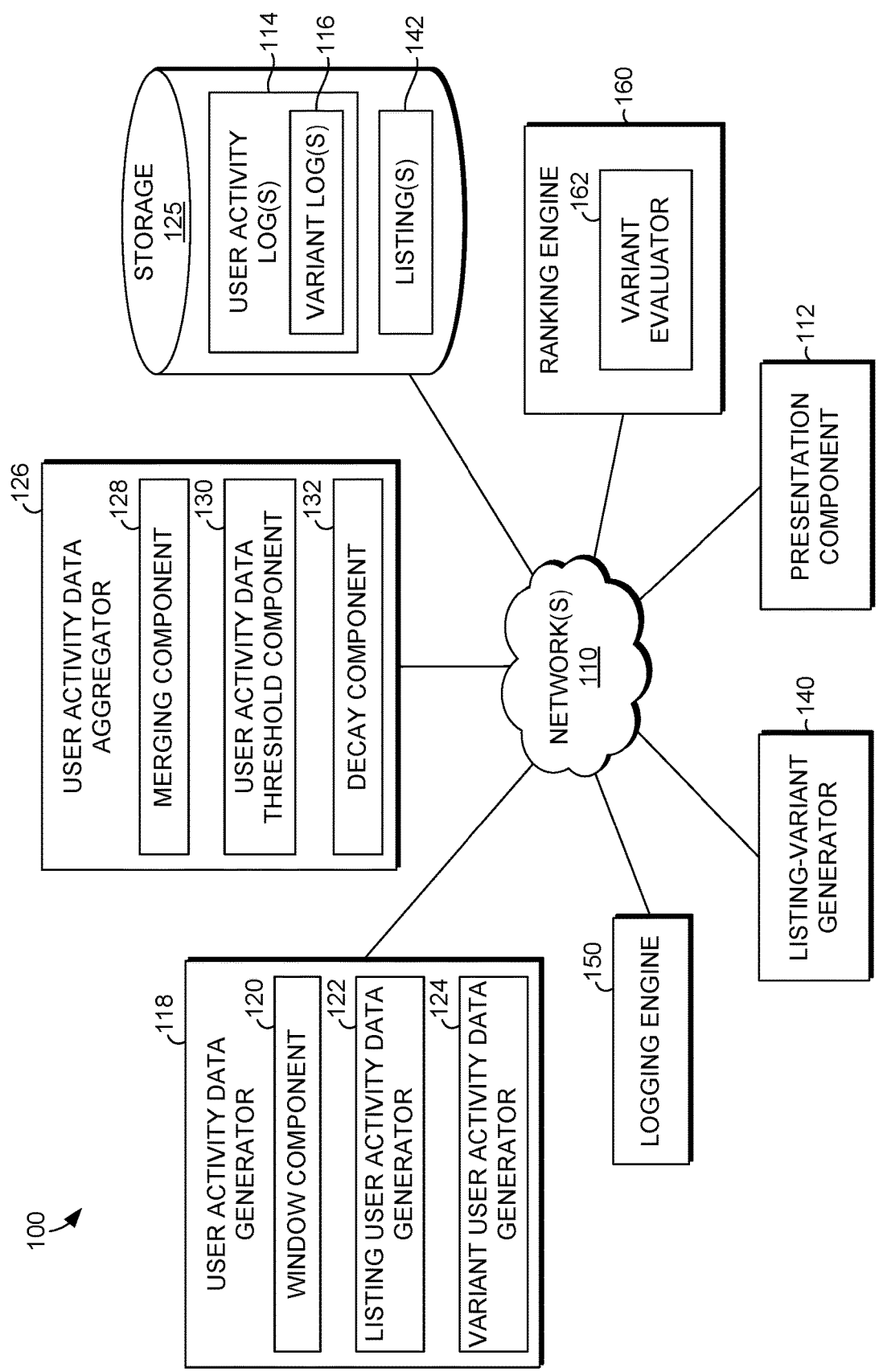
FIG. 1 is a block diagram of an illustrative system architecture in which some embodiments of the present technology may be employed, according to particular embodiments.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of methods employed, the terms should not be interpreted as implying any particular order among or between various steps herein disclosed unless and except when the order of individual steps is explicitly described.

Some items for sale in online platforms include multiple variants, which are different iterations of the same item. For example, a listing may include a sneaker item, with the variants each being a different size and color of the sneaker. In order to generate search results, existing search engine algorithms store or use item metrics only for a given listing or item itself, and not each variant of the item. One technical problem with this is that some variants may have a lot of user activity while other variants do not have a lot of user activity, which skews the accuracy of search ranking functionality. "User activity" as described herein refers to the computerized user input and/or display of information to a user device associated with a user and an item. The particular amount or quantity of user activity for a listing is indicative of a type of demand for an item based on users' historical engagement with the item. For example, user activity can include: a user selection of a variation to purchase a product of a listing (e.g., a "sale" of a variant), a user selection of a variant to view the listing in its variant form (e.g., a "view" of a variant), and/or the variant of the listing being displayed to a user device (e.g., an "impression" of a variant). If users perform lots of user activity on a first variant (indicative of high demand or popularity of the first variant) but not a second variant of a first listing, and a user requests a listing corresponding to the second variant, existing search ranking algorithms may rank the first listing high based on the user activity of first variant, which is inaccurate. This inaccuracy is at least partially because the user requested a listing associated with the second variant (but not the first variant), but the ranking is still based on the historical demand of the first variant.

The following example is one illustration of this technical problem. A user seller may generate a listing corresponding to a particular set of brand A sunglasses and then generate two variants, such as black sunglasses and red sunglasses. Subsequent to the generation of the listing and its variants, other users may perform user activity, such as clicking, selecting, viewing, and/or purchasing each variant of this listing. In some situations there may be much more user activity for the red sunglasses than the black sunglasses. For example, many more users may have purchased the red sunglasses compared to the black sunglasses. However, subsequent to these user activities, another user may issue a query for the black sunglasses, but because existing search engine technologies use the user activity for both the black sunglasses and red sunglasses, they inaccurately rank the corresponding listing higher than it should be. In other words, even though the user intent may be for the black sunglasses, the search ranking algorithm is inaccurate because it is returning the corresponding listing based on the red sunglasses' prior user activity, which is inconsistent with the user intent.

Another technical problem is that some search engine technologies, such as in the MSKU context, select the variant that is the most favorable to participate in the search ranking among all variants. This allows sellers to deliberately introduce abusive variations, which are totally unrelated to products, but the seller knows it will catapult an item to the top of the search results. For example, a seller may create an MSKU of a shoe with a cheaper variation being socks. Accordingly, when a buyer issues a query for the shoes and, for example, filters by price, the entire MSKU for the shoes may surface as a top search result because the price of the socks are much cheaper than the price of the shoes.

Various embodiments of the present disclosure provide one or more technical solutions to the technical problems described above. For example, some embodiments improve existing search engine technologies by intelligently generating user activity data for each variant of an item and ranking each corresponding listing (and/or variant) based at least in part on the user activity data of each individual variant, as opposed to user activity data of the entire listing. "User activity data" as described herein refers to metrics, statistics, and/or counts of specific user activity on one or more variants, which may be indicative of demand for a particular variant. For example, user activity data can include the quantity of times a particular variation of an item has been purchased within an electronic marketplace. In another example, user activity data can include a quantity of a times that all users of an electronic marketplace select a variant to view the item in its variant form (e.g., a quantity of time users have filtered a listing to view a particular color).

By generating user activity data for individual variants and ranking search results based on this, embodiments generate more accurate search results and granular ranking compared to existing technologies. For example, referring back to the illustration above for the sunglasses listing where a red sunglasses variant and a black sunglasses variant have been created, the sunglasses listing can be demoted to a position much lower than it would have been otherwise on a search result page. In this illustration, particular embodiments may generate much more user activity data for the red sunglasses (e.g., 50 views), relative to the black sunglasses (e.g., 10 views), even though they are part of the same listing. Accordingly, when a user issues a query for the black sunglasses, some embodiments may rank the brand A sunglasses listing fairly low (especially relative to the ranking described above) for display on a result page based at least in part on the user activity data for the black sunglasses (which is very low) and not the red sunglasses (which is high). That is, because the user intent is to search for black sunglasses, the listing is demoted because there is not as much user activity associated with the listing's black sunglasses variant notwithstanding the high user activity associated with the listing's red sunglasses variant.

This concept also helps with seller abuse situations, as described above. For example, if a listing for brand A shoes included a size variant and a "socks" variant (presumably because the socks are cheaper, which would surface any queries/filters on price), some embodiments would not necessarily rank the listing high if the query was for cheap brand A shoes because user activity data may be much higher for the size variant than the socks variant and the socks variant does not match the user intent.

Existing search engine technologies are also costly in terms of computer resource consumption, such as CPU and throughput, among other things. For example, existing search algorithms technologies rank search results based on metrics of an entire listing. However, when a CPU decodes fetched data in an instruction cycle, it performs arithmetic logic unit (ALU) operations, such as subtraction and addition. When these arithmetic operations occur for entire listing metrics, there is increased latency and potential increased throughput at runtime since entire listings contain much more data to perform arithmetic operations on for ranking. Some embodiments improve computer operation by performing arithmetic operations at runtime at the variant level, thereby decreasing latency and increased throughput since there is less data to perform arithmetic operations at runtime during ranking.

FIG. 1 is a block diagram of an illustrative search engine system architecture 100 in which some embodiments of the present technology may be employed. Although the system 100 is illustrated as including specific component types associated with a particular quantity, it is understood that alternatively or additionally other component types may exist at any particular quantity. In some embodiments, one or more components may also be combined. It is also understood that each component or module can be located on the same or different host computing devices. For example, in some embodiments, some or each of the components within the search engine system 100 are distributed across a cloud computing system. In some embodiments, the system 100 illustrates executable program code such that all of the illustrated components and data structures are linked in preparation to be executed at run-time of a query.

System 100 is not intended to be limiting and represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location. For instance, the functionality of system 100 may be provided via a software as a service (SAAS) model, e.g., a cloud and/or web-based service. In other embodiments, the functionalities of system 100 may be implemented via a client/server architecture.

The system 100 is generally directed to generating search results based at least in part on generating user activity data for one or more variants of a listing. The system 100 includes the listing-variant generator 140, the logging engine 150, the user activity data generator 118, the user activity data aggregator 126, the ranking engine 160, and the presentation component 112. In some instances, a user of a web application or app service may desire to generate a listing that describes one or more items to be offered for sale in an electronic marketplace. A "listing" as described herein includes a description and/or metadata related to an item or product offered for sale in an electronic marketplace or other online platform. For example, a first listing can include a title that describes an item for sale (e.g., "Brand A shoes Men's size 9.5 White Air Basketball 2003 New Vintage"), an image of the item for sale, an MSKU (or other identifiers that identify the item), and/or price. The listing-variant generator 140 is generally responsible for generating one or more listings and storing them to storage 125. For example, using the illustration above, the listing-variant generator 140 may receive and store the user input of the first listing to the storage 125 as one of the listing(s) 142.

The listing-variant generator 140 is additionally responsible for generating one or more variants for the one or more listings. For example, the listing-variant generator 140 can generate a predefined data object (e.g., a field, window, or data structure) that lists different variant types for the user to select, such as size, color, and/or version (e.g., brand B version 2.0 v. brand B version 3.0). In some embodiments, the listing-variant generator 140 receives the user selection input of the variant type the user wishes to create sub-items for and populates another data object (e.g., a field, window, and/or data structure) with the specific variant value(s) that the user has input. For example, the user may select a "size" variant type from a data object that the listing-variant generator 140 provides and may input the specific sizes of the item (e.g., size 9 and 8) that the user has in stock, and the listing-variant generator 140 can responsively receive this information and store it as a single listing of the one or more listings 142 to storage 125. Accordingly, even though the user may create multiple variants, such as sizes, the variants may be created as a single listing, as opposed to different listings for each variant in some embodiments. In response to receiving a user selection indication of each variant or variant value (e.g., particular shirt sizes, colors, etc.) generated for a listing, the listing-variant generator stores the listing and its variants to storage 125 indicative of the listing and/or its variants being offered for sale in an electronic marketplace or other online platform.

The logging engine 150 is generally responsible for generating entries within the user activity log(s) 114 that indicate specific user activity. Subsequent to the listing-variant generator 140 storing the one or more listings 142 to storage 125, one or more users may click, view, query, or otherwise perform user activity on the generated listing(s) 142 and/or its variants. In particular embodiments, in response to receiving this user activity, the logging engine 150 indicates the user activity in the user activity log(s) 114. In some embodiments, each entry within the user activity log(s) 114 corresponds to a particular user activity ID and an associated timestamp (and/or other metadata associated with the user activity). For example, subsequent to a listing of the one or more listings 142 being stored to storage 125, a user may issue a query for a "brand X football," which surfaces a first listing. The user may click on the first listing at a first time and select a "youth size" variation of the first listing at a second time (indicative that the user is interested in a youth-sized brand X football). Responsive to the click, the logging engine 150 may generate a first entry within the user activity log(s) 114 to indicate that the user clicked the first listing at the first time (a particular listing user activity ID with a first timestamp) and generate a second entry within the variant log(s) 116 to indicate the user selected the "youth size" variation at the second time subsequent to the first time (a particular variant ID with a second timestamp). The variant log(s) 116 are generally responsible for storing user activity of one or more variants of one or more listings. For example, using the illustration above, the logging engine 150 may populate a data object (e.g., a file) indicating that the variant "youth size" corresponding to particular variation ID was selected at timestamp A for the first listing within the variant log(s) 116. This may be contrasted with other portions of the user activity log(s) 114, where non-variant information may be stored, such as entire listing information. For example, using the illustration above, the logging engine 150 may store an indication to the user activity log(s) 114 that the user clicked the first listing (corresponding to brand X football) at timestamp D (whereas the variant log(s) 116 does not include this information but only stores information that "youth size" was selected). In this manner, different objects, logs, files, or other structures within the user activity log(s) 114 can parse out or separate user activity data for listings themselves and one or more variants of the listings.

The user activity data generator 118 is generally responsible for extracting data from the user activity log(s) 114, generating corresponding entries or records of structured data, and/or computing metrics or statistics based on the data within the user activity log(s). In some embodiments, the user activity data generator 118 generates raw statistics (e.g., impressions, views, and sales) from one or more entries within the user activity log(s) 114 within a particular window (e.g., as determined by the window component 120) and extracts data from the rest of the user activity log(s) 114 and generates records (e.g., within a second data structure) for listing information. Such information may include MSKU parents/listing IDs and SKU items.

The variation user activity data generator 124 is generally responsible for computing user activity data for each entry within the variant log(s) 116. In some embodiments, the variation user activity data generator 124 extracts data from the variant log(s) and generates records for variations within a first data structure (e.g., a key-value store). In some embodiments, each record is accessed by a key that refers to its parent or listing ID (indicating that a particular variant belongs to a particular listing). In some embodiments, the variation user activity data generator 124 initializes or copies all of the information within a particular window (e.g., as determined by the window component 120) within the variant log(s) 116 to a data structure and generates records described above and then responsively computes the user activity data for each variant from the data stored to the data structure. In this way, some embodiments to not compute raw data on-the-fly straight from the variant log(s) 116 but first initialize a data structure with the variant log(s) 116 data.

The listing user activity data generator 122 is generally responsible for computing user activity data for each entry associated with individual listings (i.e., outside of the variant log(s) 116). In some embodiments, the listing user activity data generator 122 extracts data from the user activity log(s) 114 (and not the variant log(s) 116) and generates records for listings within a second data structure (e.g., a second key-value store). In some embodiments, this second data structure is a relation that has a pointer value or other reference indicator that references the first data structure described above with respect to the variation user activity data generator 124 so that the user activity can be viewed for each listing itself and all of the listing's variations. In some embodiments, the listing user activity data generator initializes or copies all of the information within a particular window (e.g., as determined by the window component 120) within the listing to a second data structure and generates records described above and then responsively computes the user activity data for each listing from the data stored to the data structure. In this way, some embodiments do not compute raw data on-the-fly straight from the user activity log(s) 114 but first initialize a second data structure with the user activity log(s) 114 data.

The following example illustrates how the listing user activity data generator 122 and variation user activity data generator 124 may function according to some embodiments. A first user may have selected a first variation of a first listing at a first time, a second user may have selected the same first variation of the same first listing at a second time, and a third user may have selected a second listing and a second variation of the second listing at a third time all within a five minute window. All of this information may be stored to the user activity log(s) 114. The window component 120 may define the window to be a five minute time range within the user activity log(s) 114. The listing user activity data generator 122 generates metrics indicating that the first listing was selected two times and the second listing was selected once within the five minute window. The variation user activity data generator 124 generates metrics indicating that the first variation of the first listing was selected two times and the second variation of the first listing was only selected once.

The window component 120 is generally responsible for defining the window (e.g., a particular predefined time range (e.g., between two timestamps within the variant log(s) 116) or time slice) that user activity is to be analyzed within the user activity log(s) 114. In some embodiments, the "window" defined by the window component corresponds to a near-real-time time slice of information or any pre-defined historical window that is older than the near-real-time time slice. In an example illustration of a pre-defined historical window, the window component 120 can analyze or poll the user activity log(s) 114 every two hours, and each entry corresponding to a particular user activity and time slice generated within that window can be aggregated by the window component 120. Alternatively, the window component 120 can receive each entry populated to the user activity log(s) 114/variant log(s) 116 in near-real-time relative to the time at which the logging engine 150 populated the respective user activity log(s) 114 and/or the variant log(s) 116. In this way, the window component 120 can receive individual entries within the user activity log(s) 114 shortly after the logging engine 150 populates the user activity log(s) 114.

The user activity data aggregator 126 is generally responsible for aggregating the statistics or metrics generated by the user activity data generator 118 with other historical statistics or metrics that were generated prior to the window defined by the window component 120. In this way, a history of user activity data can be aggregated with other user activity data corresponding to a particular time window (e.g., a near-real-time time slice).

The merging component 128 is generally responsible for actually merging or aggregating the user activity data generated by the user activity data generator 118 with other historical user activity data. For example, using the illustration above, the listing user activity data generator 122 generated metrics indicating that the first listing was selected two times and the second listing was selected once within the five minute window, and the variation user activity data generator 124 generated metrics indicating that the first variation of the first listing was selected two times and the second variation of the first listing was only selected once within the five minute window. Other metrics stored to a data structure may indicate that the first variation of the first listing was selected 20 times prior to the five minute window defined by the window component 120 and that the second variation was selected a total of five times prior to the five minute window. Accordingly, the merging component 128 aggregates these historical and current window counts such that the merging component 128 performs arithmetic functionality indicating that the first variation has been selected a total of 22 times and the second variation has been selected a total of 6 times.

The decay component 132 is generally responsible for weighting, removing, or otherwise modifying metrics or statistics generated by the merging component 128 and/or the user activity data generator 118. In some embodiments, this is because when certain events occur or as the data gets older, the less important or useful the data is. Accordingly, in these situations embodiment algorithms may perform one or more functions to score or weight this data as less important or remove them completely. For example, some embodiments delete metrics or statistics generated by the merging component 128 and/or user activity data generator 118 that correspond to expired listings (e.g., because a seller has sold an item corresponding to a listing). In another example, if H is the current count of a metric (as indicated by historical metrics) and X is the incremental update (e.g., as performed by the user activity data generator 118 within a window), decayed H=const*H+X, at any given time period. For example, after 7 days, the half-life of a particular metric may be calculated (e.g., const=0.5$\wedge$ (1/84)=0.99178). A "half-life" may indicate the time required for a metric or statistic to reduce to half of its initial value. This reflects the current trends or popularity associated with certain listings. For example, a first user may have selected a first variation over 100 times on a particular day. However, this count of 100 may decrease to 50 (its half-life) or some other decreased weighted value after a particular time period (e.g., 20 days), which is indicative of data becoming stale or otherwise not useful as more time goes by. This also describes that each variant can be decayed individually.

The user activity data threshold component 130 is generally responsible for publishing or selecting a particular quantity of metrics to the ranking engine 160 such that the ranking engine 160 can rank one or more search results based on the metrics selected by the user activity data threshold component 130. In some embodiments, the user activity data threshold component 130 presents a select quantity of metrics left over after the merging component 128 and/or the decay component 132 performs its functionality. In an example illustration of how the user activity data threshold component 130 functions, it may only publish or render those items to the ranking engine 160 that have seen user activity over a threshold amount (e.g., a particular quantity of views, sales, impressions, or other clicks) and/or within a threshold time period (e.g., 60 days). In this way, the ranking engine 160 can increase throughput, decrease I/O, and/or reduce CPU utilization because it does not have to process all of the user activity data historically generated, since some of it may not be relevant or be associated with very little user activity.

The ranking engine 160 is generally responsible for ranking search results based at least in part on user activity data for one or more variants of one or more listings. In various embodiments, the ranking engine 160 employs one or more algorithms that rank search results (e.g., listings and/or variants) according to the results that best answer a searcher's query or match user intent by most relevant to least relevant. For example, the one or more algorithms may include key-word matching algorithms, such as term frequency-inverse document frequency (TF-IDF) algorithms that match important words (and/or selected filters) in a query to corresponding listings or variants. TF-IDF algorithms include numerical statistics that infer how important a query word or term is to a data set (e.g., a listing). "Term frequency" illustrates how frequently a term of a query occurs within a data set, which is then divided by the data set length (i.e., the total quantity of terms in the data set). "Inverse document frequency" infers how important a term is by reducing the weights of frequently used or generic terms, such as "the" and "of," which may have a high count in a data set but have little importance for relevancy of a query. Additionally or alternatively, the one or more algorithms may include semantic analysis engines, such as latent semantic indexing keywords in content (LSI) (e.g., to determine whether the user intent was APPLE the computer company v. apple the fruit). Additionally or alternatively, the one or more algorithms may include machine learning algorithms and models, such as gradient boosting trees, random forest, WORD2VEC, LSTM, etc. The ranking engine 160 may additionally or alternatively include any other suitable algorithm to rank search results.

The variant evaluator 162 is generally responsible for scoring (e.g., via integer or other real-number values) individual search results for ranking by the ranking engine 160 based on the user activity data for one or more variants of one or more listings. In this way, scores from the variant evaluator 162 that reflect variant metrics can be stored to the ranking engine 160's index so that overall search ranking can be more accurate. In some embodiments, the variant evaluator 162 uses a rule or policy that specifies the higher the counts of certain user activity data for particular variants, the higher the associated score will be. For example, in response to receiving a query, the variant evaluator 162 may compare impressions, views, and sales counts of different variants of different listings that best match the user intent or query (e.g., via any of the methods described above with respect to the ranking engine 160, such as TF-IDF) and score listings based on the counts. For instance, the query may include a search for "red shoes," and a first "color" variant where the value is red for a first listing may have been subject to five sales, a second "color" variant where the value is red for a second listing may have been subject to 10 sales, and a third "color" variant where the value is red for a third listing may have been the subject to 20 sales. Accordingly, the variant evaluator 162 scores the third listing the highest because it has the highest sales (20), scores the second listing lower than the third listing because it has the second most sales (10), and scores the first listing last or lower than the second listing because it has the least amount of sales (5). The ranking engine 160 may then use these scores as alternative or additional signals to be used in ranking search results such that the search results are ranked based at least in part on the scores generated by the variant evaluator 162. For instance, the ranking engine 160 may rank the third listing the highest and the first listing last based on the scores generated by the variant evaluator 162.

Example system 100 also includes a presentation component 112 that is generally responsible for presenting content and related information to a user device, such as one or more search result pages with ranked search results generated by the ranking engine 160. Presentation component 112 may comprise one or more applications or services on a user device, across multiple user devices, or in the cloud. For example, in one embodiment, presentation component 112 manages the presentation of content to a user across multiple user devices associated with that user. Based on content logic, device features, associated logical hubs, inferred logical location of the user, and/or other user data, presentation component 112 may determine on which user device(s) content is presented, as well as the context of the presentation, such as how (or in what format and how much content, which can be dependent on the user device or context) it is presented and/or when it is presented.

In some embodiments, presentation component 112 generates user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts. In some embodiments, the presentation component 112 generates structured data, tagged data or otherwise causes presentation of structured or tagged data that was previously unstructured, semi-structured, or untagged. For example, in some embodiments the presentation component 112 causes display of ranked variants, which may have been previously unstructured or otherwise been in a different form (e.g., existed only as a listing) than the output provided by the presentation component 112. In this way, some embodiments convert input data to an output that is different than the input.

Example system 100 also includes storage 125. Storage 125 generally stores information including data, computer instructions (e.g., software program instructions, routines, or services), data structures, and/or models used in embodiments of the technologies described herein. By way of example and not limitation, data included in storage 125, as well as any user data, may generally be referred to throughout as data. Any such data may be sensed or determined from a sensor (referred to herein as sensor data), such as location information of mobile device(s), smartphone data (such as phone state, charging data, date/time, or other information derived from a smartphone), user activity (for example: app usage; online activity; searches; voice data such as automatic speech recognition; activity logs; communications data including calls, texts, instant messages, and emails; website posts; other records associated with events; etc.)

including user activity that occurs over more than one user device, user history, session logs, application data, contacts data, record data, notification data, social-network data, home-sensor data, appliance data, global positioning system (GPS) data, network connections such as Wi-Fi network data, or configuration data, data regarding the model number, firmware, or equipment, device pairings, such as where a user has a mobile phone paired with a Bluetooth headset, for example). In some respects, data or information (e.g., the requested content) may be provided in user signals. A user signal can be a feed of various data from a corresponding data source. For example, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. Some embodiments of storage 125 may have stored thereon computer logic (not shown) comprising the rules, conditions, associations, classification models, and other criteria to execute the functionality of any of the components, modules, analyzers, generators, and/or engines of systems 100.

Figure 2A:
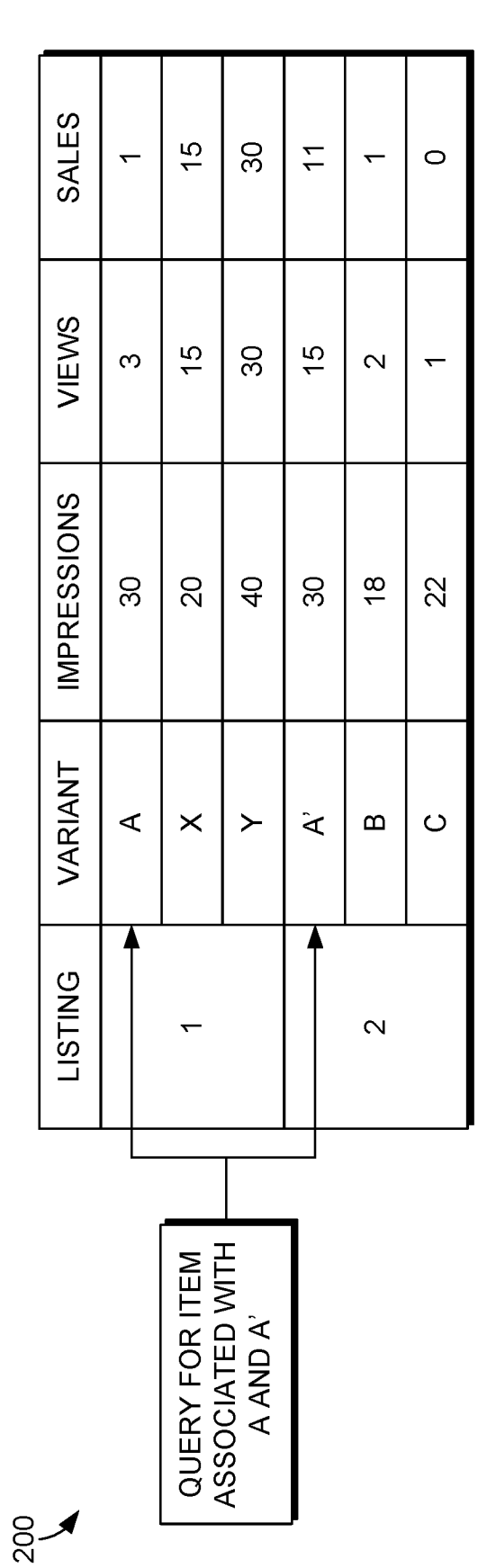
FIG. 2A is a schematic diagram illustrating user activity data generated for each variation of different listings and a user that issues a query associated to a single variation of both listings, according to particular embodiments.

FIG. 2A is a schematic diagram illustrating user activity data generated for each variation of different listings and a user that issues a query associated to a single variation of both listings. In some embodiments, the table 200 represents a data structure (e.g., a hash table) or combination of data structures stored in computer memory. In some embodiments, values within the table 200 represent the user activity data generated by the variation user activity data generator 124. In some embodiments, the table 200 itself represents the first data structure described above with respect to the variation user activity data generator 124. Accordingly, the table 200 can represent each listing and each variant of each listing, and its associated user activity extracted from the variant log(s) 116 that has been subject to user activity data generation.

Specifically, the table 200 illustrates that there are listing IDs 1 and 2, corresponding to two different listings. For listing 1 (i.e., the first record), there are 3 variation IDs A, X, and Y each corresponding to variations and sub-entries or records. Each variant is associated with a particular quantity of user activity—impressions, views, and sales. The "impression" field may indicate the particular quantity of times the corresponding variation was displayed to user computing device. The "views" field may indicate the particular quantity of times the corresponding variation was clicked on or otherwise selected by a user. The "sales" field may indicate the particular quantity of times a user actually purchased or transacted an item that includes the corresponding variation attribute.

As illustrated in FIG. 2A, a user may issue a query for an item that matches or is otherwise associated with variation A and A'. For example, a user may issue a query for "brand A black shoes." Listing 1 may correspond to a brand A shoes item and listing 2 may correspond to another brand A shoes item from a different seller. The A and A' variations may correspond to a "black" color variation for the respective listing (e.g., and all other variations X, Y, B, and C may correspond to other different colors) for brand A shoes. Although FIG. 2A illustrates that listings 1 and 2 each have variants and ranking can be based on comparing individual variants, it is understood that listings need not have variants to be ranked and compared with other variants. For example, listing 2 may not be an MSKU that has variants, but instead is a single listing with no variants that describes the variant in the title. In these embodiments, user activity metrics for entire listings can be compared against user activity data for individual variants. For instance, the total count of all variants A', B, and C of listing 2 can be aggregated (count=100), and compared to the individual variant A of listing 1. Although in some embodiments, when listings do not have variants, those listings can be decayed or otherwise weighted less, which assumes that not all counts are relevant for the query related to variation A. For example, the total aggregation count of 100 of listing 2 can be de-valued to 30. This value of 30 can then be compared with individual variants' user activity data (e.g., only user activity data of variant A).

Figure 2B:
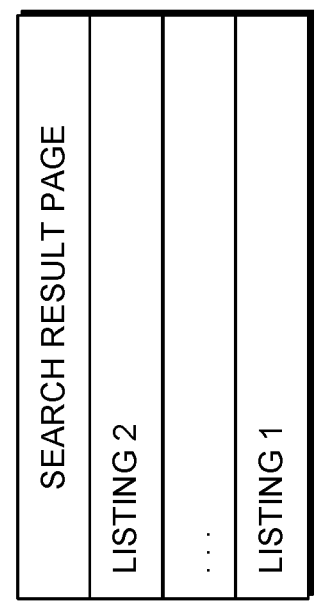
FIG. 2B illustrates the ranking order of the listings of FIG. 2A based on user activity data that are relevant to the query issued in FIG. 2A, according to particular embodiments.

Various embodiments of the present disclosure rank listings based at least in part on the user activity data of individual variants that are relevant for a query and not as much as any other variants of a listing, as illustrated, for example, in FIG. 2B. FIG. 2B illustrates the ranking order of the listings of FIG. 2A based on user activity data that are relevant to the query issued in FIG. 2A. As illustrated in FIG. 2B, listing 2 is ranked higher than listing 1 on the displayed search result page. This is at least partly because particular embodiments compare variants A and A' to determine that variation A' of listing 2 has higher counts than the A variation of listing 1. For example, the "sales" field indicates that there has been a total of 11 sales for the A' variation compared to the variation A sales, which is only 1. Further, there have been more views (15) for the A' variation compared to the A variation (3). In total, there is a count of 56 user activity units for variant A' (30+15+11) compared to only 34 user activity units for variant A (30+3+1). Accordingly, embodiments (e.g., the ranking engine 160) rank listing 2 higher than listing 1 because it has more user activity data for the relevant A and A' variations. Various embodiments use only individual user activities (e.g., impressions but not views or sales) for ranking or scoring or a total aggregate count of individual user activities (impressions+views+sales).

Some embodiments completely disregard other non-relevant variant user activity data for search engine ranking. That is, search ranking in some embodiments is not based on non-relevant variant user activity at all (i.e., variants that are not relevant to a query). For example, with respect to FIG. 2A, none of the user activity data from variations X, Y, B, and C are used for ranking in some embodiments since they do not match or are relevant to the query. Some embodiments alternatively weight non-relevant variant user activity data much lower for search engine ranking even though the user activity data is still used for search ranking. That is, search ranking in some embodiments is based at least in part on non-relevant variant user activity, except that embodiments can score or weight the corresponding variants/listings much lower. For example, referring back to FIG. 2A, because variant Y is not relevant for the query, its sales value of 30 can be reduced to half (or any decaying value) of its original value to 15. In this way, for example, the variant evaluator 162 does not score this variant as high as it would have had the value been 30 instead of 15.

Because other non-relevant user activity data is not used or weighted towards less importance or relevance, embodiments can thus generate more fine-grained and accurate search result ranking relative to existing search engine technologies. This is illustrated in FIGS. 2A and 2B. For instance, listing 2 is ranked higher than listing 1 even though listing 1 has much more user activity data counts compared to listing 2—i.e., the total user activity counts of A, X, and Y of listing 1 sum to 184, whereas the total user activity counts of listing 2 sums to 89, indicating that many more people engaged with listing 1 relative to listing 2. In existing ranking technologies, based on these total counts, listing 1 would be ranked higher than listing 2. However, in embodiments, given the query and the relevance of the variation in relation to the query, those user activity data from the relevant variants are solely used or weighted much higher for search result ranking. For instance using the example above, if the query was for "brand A black shoes," only the "black" variant (i.e., variant A and A') from both listings is relevant (e.g., due to term "black" matching or any other factor described with respect to the ranking engine 160). And because the user activity data counts from variant A' are higher than the variation A counts, listing 2 is ranked higher notwithstanding the total aggregate user activity from all variants is higher for listing 1.

FIG. 2C is a schematic diagram illustrating the user activity data for the first listing of FIG. 2A, except that two different queries are issued for two different variations of the same listing. That is, a first user can issue a query for an item that includes term(s) that match (and/or are otherwise semantically related to) variation A, and a second user can issue another query for an item that includes term(s) that match (and/or are otherwise semantically related to) variation Y of the same listing 1. For example, the first user's query can be "brand A black shoes" whereas the second user's query can be "brand A red shoes."

FIGS. 2D and 2E illustrate the positioning or ranking of listing 1 on a search result page depending on the query issued and the specific user activity data of a variant associated with the query. For example, using the illustration above, in response to embodiments receiving the first user's query "brand A black shoes," the variant evaluator 162 may first run the term "black shoes" against an index of listings that describe or indicate "black shoes" listings. Responsively, the variant evaluator can determine that variation A of listing 1 is relevant (e.g., via any of the methods described above with respect to the ranking engine 160, such as TF-IDF) to the query and the other variations X and Y are not relevant. Responsive to this determination, some embodiments determine the user activity data of variation A (and disregard or weight less the other user activity data of X and Y since it was determined not to be relevant). Responsive to this determination of the user activity data of variation A (e.g., summing the count to 34 (30+3+1)), embodiments compare the user activity data of variation A to related variations of other listings that are relevant to the query. For example, a first listing can have a total count of 40, and a second listing can have a total count of 50, which are higher than the total counts of 34 corresponding to listing 1. Accordingly, based on these total counts, listing 1 can be demoted ranked to a third position on the search result page for the variation A query, as illustrated if FIG. D because its counts are only the third highest.

FIG. 2D generally illustrates a search result page 200-2 indicating that listing 1 of FIG. 2C is ranked low relative to other listings because the variation A user activity data and its counts are lower than related user activity data of other listings. FIG. 2E, however, illustrates that the same listing 1 of FIG. 2C can be promoted or ranked to a higher positioning within its respective search result page 200-3 relative to its positioning within the search result page 200-2 of FIG. 2D. Specifically, for example, listing 1 is ranked higher or in a highest position within the search result page 200-3 but the same listing 1 is ranked in a second lowest positioning in the search result page 200-2. The promotion of listing 1 within the search result page 200-3 is because the ranking is based on the query being for variation Y and variation Y's corresponding user activity data is higher relative to related variants of other listings. Further, this promotion is based on the user activity data of variation Y being higher relative to the user activity data of variation A even though they belong to the same listing 1. For instance, variation Y was subject to 30 sales, whereas variation A was only subject to 1 sale. Accordingly, the ranking or positioning of listing 1 within a search result page may depend on the specific query issued and the specific user activity data for a given variant. With respect to FIG. 2E, because the query was for variation Y, and variation Y had more sales than variation A (30 compared to 1), listing 1 is ranked much higher on the search result page 200-3 relative to the search result page 200-2, since the search result page 200-2 is provided based on the query for variation A, which has relatively lower use activity data compared to variation Y.

Figure 3:
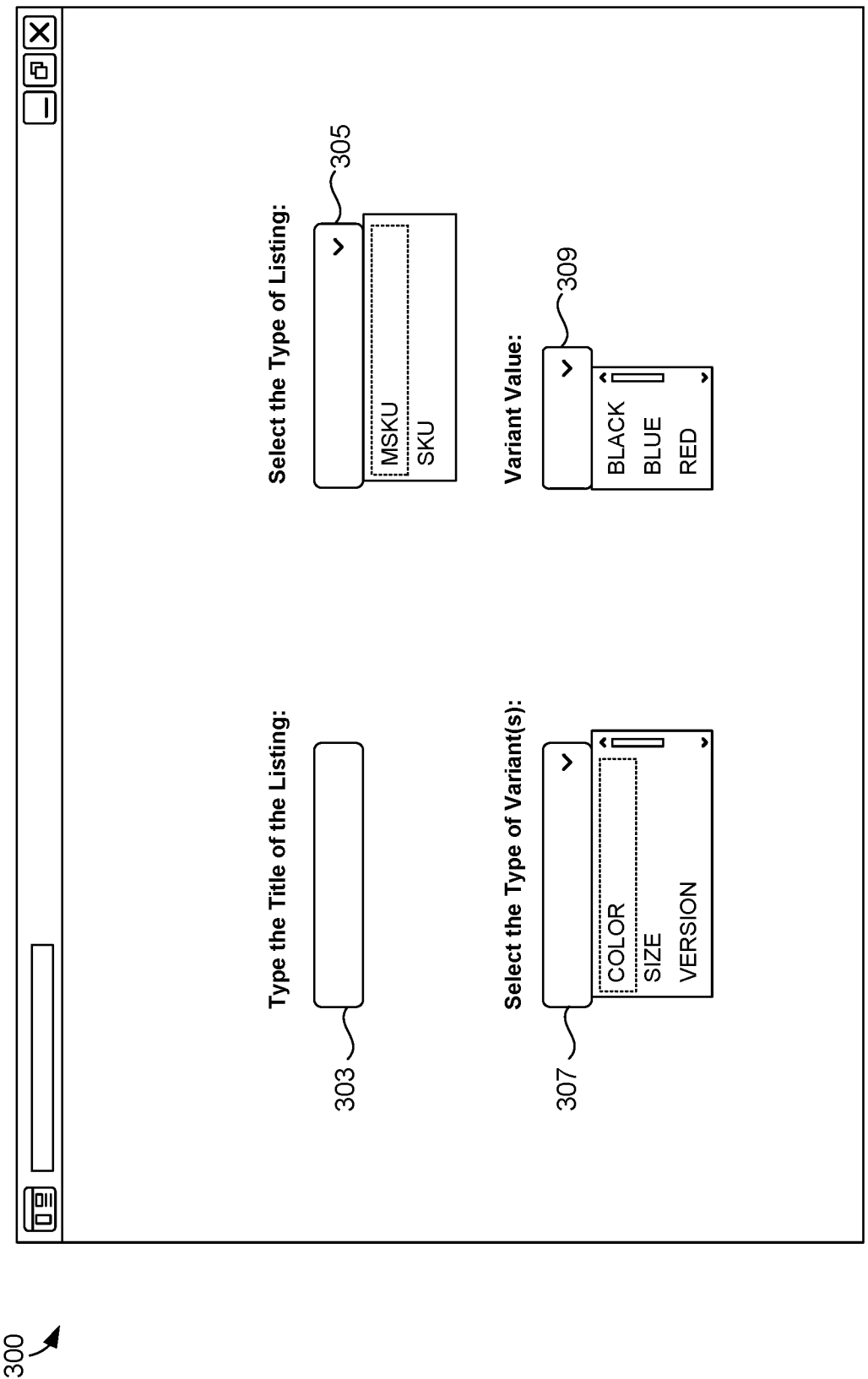
FIG. 3 is a screenshot of an example user interface depicting how one or more variants may be generated from a listing, according to particular embodiments.

FIG. 3 is a screenshot 300 of an example user interface depicting how one or more variants may be generated from a listing, according to some embodiments. In some embodiments, the listing-variant generator 140 of FIG. 1 generates listing and variants by receiving user selections as indicated in FIG. 3. In some embodiments, the presentation component 112 causes presentation of the screenshot 300 to one or more user devices. It is understood that the screenshot 300 is representative only. As such, there may be additional or different graphical user interface elements than depicted in FIG. 3. For example, in some embodiments, the screenshot 300 includes an image-upload feature that is configured to receive an image requested for upload by a user device, which is indicative of a photo of the item for sale. Alternatively or additionally, in some embodiments, the screenshot 300 does not include one or more predetermined features, such as "types" of variants or variant "values" as indicated in the UI elements 307 and 309, rather a user can manually type in this information.

In various instances, users, such as sellers in electronic marketplaces desire to offer items for sale. Accordingly, the users may generate a listing with multiple variants as indicated in FIG. 3. For example, the listing-variant generator 140 can receive the title of a listing a user wishes to associate an item for sale with based on receiving input into the field 303. In another example, particular embodiments receive the type of listing the user wishes to create, such as an MSKU (a listing with multiple variants) or SKU (e.g., a listing with no variants or includes all the variants in its title) based on a user selection of a feature within the UI element 305. The UI element 305 indicates that the MSKU has been selected.

Some embodiments also receive the "type" of variants based on a user selection of the UI element 307, which in some aspects, is a drop-down menu that is scrollable. In some embodiments, the UI element 307 or the types of variants available are selectable in response to a user selection of the MSKU identifier in the UI element 305. In this way, once embodiments determine that a user has selected a listing that has multiple variants, embodiments can provide for display within the screenshot 300 the types of variants the user wants to associate with the listing. For example, the user may only have certain types of variants (e.g., colors of T-shirts) and not others (e.g., the T-shirts are all medium size so there are no size variations).

Some embodiments also receive the specific "value" of variants based on a user selection of the UI element 309, which in some aspects, is a drop-down menu that is scrollable. In some embodiments, the UI element 309 or variant values are selectable in response to a user selection of the specific type value selected in the UI element 307. In this way, once embodiments determine that a user has selected a particular variant type, embodiments can provide for display within the screenshot 300 the variant values according to the variant type selected. For example, if the "color" type was selected, then embodiments can provide a list of colors as indicated in the UI element 309. Alternatively, for example, if the "size" type was selected, then embodiments can provide a list of sizes (as opposed to colors).

FIG. 4A is a screenshot 400 of an example user interface depicting a search result page rendered at a first time in response to a user issuing a query. In some embodiments, the screenshot 400 (and 400-1) is provided by the presentation component 112 as described with respect to FIG. 1. The search field 411 receives the user query "Brand A white sneakers" and embodiments receive a selection of the "search button." In response to this selection or query, embodiments rank each of the listings as depicted in FIG. 4A. That is listing 401 is ranked or positioned first (indicating a highest score or most relevant listing), followed by listing 403, then 405, then 407, and listing 409 is last (indicating a lowest score or least relevant listing). In some embodiments, this ranking or positioning is based on the functionality described with respect to the user activity data generator 118, user activity data aggregator 126, and/or the ranking engine 160. In this way, search result ranking is based at least in part on user activity data of particular variants, as opposed to entire listings. For example, the "white" variant of listing 401 may have the highest "view" counts relative to the other listing's "white" variants.

In some embodiments, some or all of the listings within FIG. 4A are represented in data structures similar to the table 200 of FIG. 2A. Accordingly, for example, each variation of the listing can be represented along with its user activity data similar to variation's A, X, and Y for listing 1 of the table 200. In this way, for example, listing 401 is ranked the highest because its "white" variants may have the highest user activity data counts relative to the other listings 403, 405, 407, and 409. This is notwithstanding that some listings or titles do not explicitly recite the variant. For example, listing 401's title only recites "Brand A shoes Men's size 9.5 Air Basketball 2003 New Vintage," which does not indicate "white," but because it has variants (e.g., it is an MSKU), the query is compared to the individual variants and variant user activity data, and not just the entire user activity of listings and listing information only available in the title. In some embodiments, listing 2 of FIG. 2B represents listing 401 of FIG. 4A and listing 1 of FIG. 2B represents listing 409 of FIG. 4A.

Figure 4B:
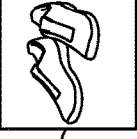
FIG. 4B is a screenshot of an example user interface depicting a search result page rendered at a second time subsequent to the first time of FIG. 4A in response to a user issuing another query, according to particular embodiments.

FIG. 4B is a screenshot 400-1 of an example user interface depicting a search result page rendered at a second time subsequent to the first time of FIG. 4A in response to a user issuing another query. As illustrated in FIG. 4B, the search result page positions the listings in a different orders relative to FIG. 4A, which is indicative of the rankings being different. For example, listing 405 of FIG. 4B is now ranked the highest and takes the highest positioning relative to its positioning in FIG. 4B, which is third lowest.

The change in positioning of listings from FIG. 4A to 4B may be due to one or more factors. For example, in some embodiments, user activity data for a variant gets updated or otherwise changes, which responsively changes the ranking of a listing. For example, referring back to FIG. 4A, at a first time responsive to the user issuing the "brand A white sneakers" query, the user activity data for white sneakers for listing 405 may be a first count (e.g., 3 sales). However, at a second time subsequent to the first time, responsive to a user issuing the same or similar query into the search field of FIG. 4B, the user activity data for white sneakers for listing 405 may have increased in count (e.g., 30 sales) due to more time that has passed, allowing more user activity to occur on particular listings. Accordingly, in this example, the updating of the user activity data for the white sneakers variant of the listing 405 causes the listing 405 to be elevated or otherwise ranked higher in FIG. 4B relative to FIG. 4A. And because this updated user activity data may also be higher relative to the other listings, listing 405 is ranked in a first position.

In some embodiments, the change in positioning of the listings from FIG. 4A to 4B is additionally or alternatively due to a user issuing a different query. For example, the query input into the field 411 in FIG. 4A is "Brand A white sneakers," whereas a query input into the same field in FIG. 4B may be "Brand A black sneakers." At least partially because the user activity data for "black" variants may be much higher than the user activity data for "white" variants for listing 405, the listing 405 is ranked higher in FIG. 4B relative to its positioning in FIG. 4A. This concept is explained in FIGS. 2C, 2D, and 2E.

Figure 5:
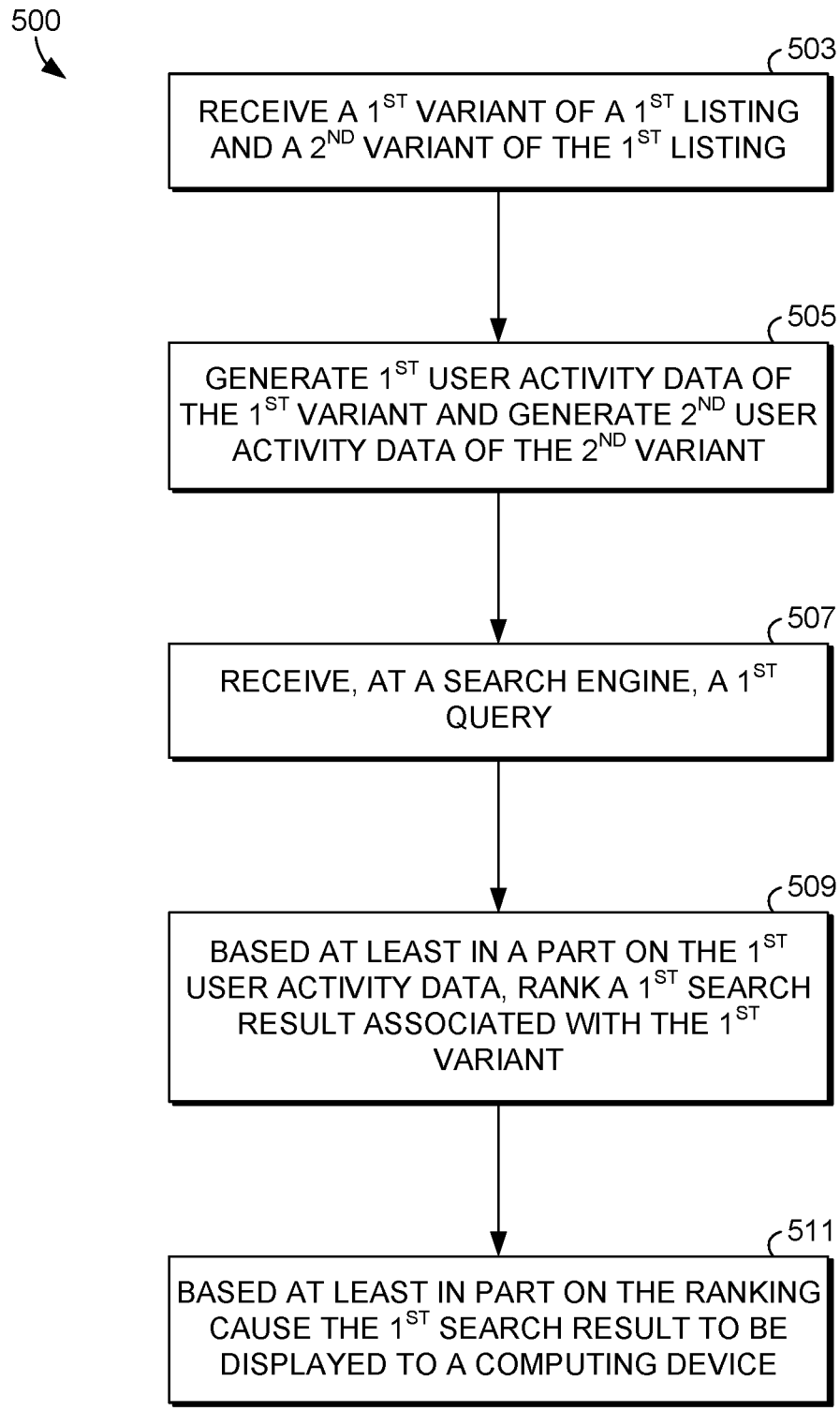
FIG. 5 is a flow diagram of an example process for ranking a first search result based at least in part on user activity data associated with a first variant, according to particular embodiments.

FIG. 5 is a flow diagram of an example process 500 for ranking a first search result based at least in part on user activity data associated with a first variant. The process 600 (and/or any operation described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. Such added blocks may include blocks that embody any functionality described herein. The computer-implemented method, the computerized system (that includes computer storage memory and one or more processors), and/or the computer storage media as described herein may perform or be caused to perform the processes 600 and/or any other functionality described herein.

Per block 503 a first variant of a first listing and a second variant of the first listing is received. This listing may describe an item for sale in an electronic marketplace. The first variant may describe a different iteration of the item relative to the second iteration. For example, the first variant may be a "black" brand A watch, whereas the second variant may be a "green" brand A watch. In some embodiments, the listing-variant generator 140 performs block 503 by receiving a request to generate the first listing and its variants, as described above in FIG. 1 and/or FIG. 3. In some embodiments, the first variant and the second variant include at least one variant from a group of variants consisting of: size of the item, a color of the item, and a price of the item. For example, the first variant may correspond to a size of the item and the second variant may correspond to a color of the item. In another example, the first variant may corresponding to a first size of the item and the second variation may correspond to a second size of the item different than the first size.

In some embodiments the first listing includes a Multi-Stock Keeping Unit (MSKU) ID that indicates that there are multiple iterations (variants) of the listing and refers to a specific stock item in a seller's inventory or product catalog. In these embodiments, the first variant and the second variant have the same MSKU ID as the listing even though the variants correspond to different versions of the same items or physical products. In this way, search results can be listings and so the listings themselves can be ranked, as opposed to the variants of the listing even though the variants correspond to different products since they are associated with different attributes.

In some embodiments, block 503 alternatively or additionally receives a first listing and a first variant that describes an iteration of the first listing relative to a second variant and additionally a second listing and a third variant that describes an iteration of the second listing. Both listings may describe respective items for sale in an electronic marketplace. For example, referring back to FIG. 2A, embodiments can receive the listing 1 and listing 1 and all of the data within the table 200.

Per block 505, first user activity data is generated for the first variant and second user activity data is generated for the second variant. In some embodiments, block 505 is performed by the variation user activity data generator 124 of FIG. 1 and includes some or all the functionality described with respect to the user activity data generator 124. In some embodiments, the first user activity data corresponds to user input metrics associated with the first variant and the second user activity data corresponds to user input metrics associated with the second variant. For example, referring back to FIG. 2A or 2B, variant A can be the first variant and the user activity data can be the values under the impressions, views, and/or sales columns or an aggregated sum thereof for variant A (e.g., 1 sale). Likewise, variant X can be the second variant and the user activity data can be the impressions, views, and/or sales columns or an aggregated sum thereof for variant X (e.g., 15 sales). In some embodiments, other user activity data can be generated for other variants, such as generating third user activity data of a third variant (e.g., variant Y of listing 1 in FIG. 2A) and the third user activity data also corresponds to user input metrics associated with the third variant and fourth user activity data of a fourth variant.

The "user activity data" may include any suitable user activity data. For example, the user activity data can be a quantity of sales of the first variant, a quantity of views of the first variant, and a quantity of impressions of the first variant. For example, referring back to FIG. 2A, for the variant C of listing 2, there are 22 impressions, 1 view, and 0 sales.

Per block 507, at least a first query is received at a search engine. In some embodiments, the ranking engine 160 is the component that receives the query per block 507. In some embodiments, the first query is associated with the first variant. For example, referring back to FIG. 2C, the query for variation A may be "associated" with variation A because the query contains one or more keywords that match variation A, contains one or more keywords that have the same semantic meaning as variation A, and/or otherwise is relevant to variation A (e.g., as described by the ranking engine 160). Queries may not be associated with variations if the query does not contain one or more keywords that match variation A, contain on ore more keywords that have the same semantic meaning as variation A, and/or otherwise variation A is not relevant to the first query. In some embodiments, the search engine also receives a second query associated with the second variant. For example, referring back to FIG. 2C, the search engine can additionally receive the query for variation Y.

In some embodiments, however, the search engine need only receive a single query that is associated with both the first variant and the third (or second variant). In these embodiments, the query can contain one or more keywords the match both variation A and A', contain one or more keywords that have the same semantic meaning as both variation A and A', and/or otherwise both variations A and A' are relevant to the query. For example, this is described with respect to FIG. 2A, where the query for an item associated with both A and A' causes the system to analyze both variants A and A'. In this way, the query can correspond to a request for an item that includes an attribute that matches the first variant and the third variant. For instance referring to FIG. 2A, if the query was "blue brand A shirt," both listings 1 and 2 from different sellers may have a blue brand A shirt in stock (corresponding to variants A and A'). Accordingly, the "blue" in the query may match a "blue" attribute as indicated in variation A of listing 1 and a "blue" attribute as indicated in variation A' of listing 2.

Per block 509, a first search result associated with the first variant is ranked based at least in part on the first user activity data. In some embodiments, the ranking engine 160 performs the ranking and at least some of its functionality as described with respect to the ranking engine 160 is included in block 509. Some embodiments rank a first search result associated with the first variant higher than a second search result associated with the second variant based at least in part on the first user activity data relative to the second user activity data of the same first listing. For example, referring back to FIGS. 2D and 2E, listing 1 is ranked higher on the search result page 200-3 relative to its ranking on the search result page 200-2 based at least in part on the user activity data being higher for variation Y relative to variation A as illustrated in FIG. 2C.

In some embodiments, a "search result" as described herein is an actual variant itself, as opposed to entire listings as depicted in FIGS. 2D and 2E. In this manner the first search result described above, for example, is the first variant and the second search result is the second variant in some embodiments. For example, referring back to FIG. 2C, variation A, variation X, or variation Y may be individual search results as opposed to listing 1. Alternatively, in some embodiments, a "search result" is the listing at two different times and two different search result pages. In these embodiments, the first search result described above is the listing at a first time, and the second search result is the same listing at a second time subsequent to the first time. For example, referring back to FIGS. 2D and 2E, the first search result can be listing 1 of FIG. 2D at the first time, and the second search result can be listing 1 of FIG. 2E at a second time.

In some embodiments, the first search result is presented in response to the first query being issued and the second search result is presented in response to a second query being issued that is different than the first query. For example, this is described with respect to FIGS. 2C, 2D, and 2E where the search result page 200-2 is presented in response to the query for variation A being issued and the second result page 200-3 is presented in response to the query for variation Y being issued.

In some embodiments, in response to the receiving of the first query and based on the first user activity data, the listing is ranked as a search result at a first time. Additionally, some embodiments rank, at a second time subsequent to the first time, the listing as another search result in response to the receiving of the second query (described at block 507) and based on the second user activity data. In this regard, the ranking of the listing at the second time is different relative to the ranking of the same listing at the first time based at least in part on the second user activity data relative to the first user activity data. Examples of this are described with respect to FIGS. 2C, 2D, and 2E where the same listing 1 is ranked differently on different search result pages depending on the query and user activity data for corresponding variants.

In some embodiments, the ranking of the listing at the first time is not based on the second user activity data and the ranking of the listing at the second time is not based on the first user activity data. Accordingly, certain embodiments only employ user activity data of particular variants that are relevant for particular queries. For example, referring back to FIGS. 2C, 2D, and 2E, for the query of variation A, particular embodiments only use variation A metrics for ranking (i.e., the 30 impressions, 3 views, and the 1 sale), as opposed to variation X and variation Y metrics even though they are a part of the same listing. This at least partially explains the demoted position of the listing 1 in the search result page 200-2 relative to its position in the search result page 200-3. In some embodiments, the ranking of the listing at the first time causes the listing to be displayed to a first search results page in a first position, and the ranking of the same listing at the second time causes the listing to be displayed to a second search results page in a second position lower than the first position. For example, referring back to FIGS. 2E and 2D, the first search results page can be page 200-3 and the second search results page can be 200-2, which shows listing 1 being in a position lower than its position on search results page 200-3.

In some embodiments, the ranking at block 509 is based on the quantity of sales of the first variant being higher relative to the second variant, the quantity of views of the first variant being higher relative to the second variant, and/or the quantity of impressions of the first variant being higher relative to the second variant.

In some embodiments, a first listing is ranked higher than a second listing based on the query and the first user activity data relative to third user activity data (described above). In these embodiments, user activity data of specific variants of different listings are compared and analyzed as opposed to the first and second user activity data of the first listing. For example, referring back to FIGS. 2A and 2B, because there is more user activity data for listing 2's variant A' (e.g., 11 sales) relative to listing 1's variant A (1 sale), embodiments rank listing 2 higher than listing 1 as illustrated in FIG. 2B. Using this illustration, in some embodiments the ranking of the first listing higher than the second listing is not based on the user activity for the second variant. For example, the ranking of listing 2 higher than listing 1 in FIG. 2B is not based on any of the variants X, Y, B, and C since these variants are not relevant to the query for an item associated with A and A'.

In some embodiments, the ranking of the first listing higher than the second listing is based at least in part on determining, by comparing the first user activity data to the third user activity data, that there is more user activity data for the first variant relative to the third variant. For example, referring back to FIGS. 2A and 2B, embodiments can compare the sales counts of A' (11) with the sales counts of variant A (1) and determine that the sales counts of variant A' is higher. Responsively, embodiments rank the corresponding listing 2 higher than listing 1 as illustrated in FIG. 2B.

Per block 511, the first search result is caused to be displayed to a computing device based at least in part on the ranking. In some embodiments, this block is performed by the presentation component 112 and includes some or each of the functionality as described with respect to FIG. 1. For example, some embodiments cause the first listing to be displayed to a search result page in a more prominent position relative to the second listing based on the ranking. For example, referring back to FIG. 2B, listing 2 is caused to be displayed (e.g., by the presentation component 112) on the search results page of FIG. 2B in a higher or more prominent position relative to listing 1. A "prominent" position may indicate one search result being higher on a page than another, one search result having a visibly higher score relative to another, one search result being bold or otherwise conspicuous relative to another, one search result being on a different page relative to another, and/or any other suitable graphical representation that indicates search results are relevant or not relevant. Other examples of block 511 are described with respect to FIG. 2D, FIG. 2E, FIG. 4A, and FIG. 4B.

In some embodiments, the ranking of block 505 and the display of block 511 can change based on one or more factors, such as updating user activity data indicative of variants becoming more or less in demand. For example, some embodiments update the second user activity data associated with the second variant and receive another query associated with the item. Based at least in part on the update of the second user activity data, the second search result can be ranked higher relative to its ranking prior to the update. For example, referring back to FIGS. 2A and 2B, after the process 500 has been completed, variant A may be subject to 40 more sales, which indicates more user activity data for variant A. Accordingly, in response to the same query for the item associated with A and A', the listing 1 may now be ranked more prominently than listing 2 (e.g., because there have been 41 sales for A compared to only 11 sales for A') within the search results page of FIG. 2B.

Figure 6:
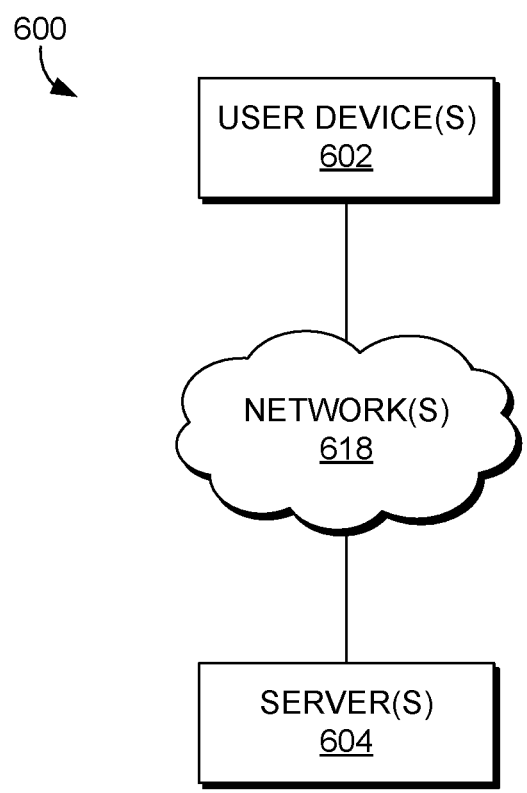
FIG. 6 is a block diagram of a computing environment in which aspects of the present technology are implemented within, according to particular embodiments.

FIG. 6 is a block diagram of a computing environment 600 in which aspects of the present disclosure are employed in, according to certain embodiments. Although the environment 600 illustrates specific components at a specific quantity, it is recognized that more or less components may be included in the computing environment 600. For example, in some embodiments, there are multiple user devices 602 and multiple servers 604, such as nodes in a cloud or distributing computing environment. In some embodiments, some or each of the components of the system 100 of FIG. 1 are hosted in the one more servers 604. In some embodiments, the user device(s) 602 and/or the servers(s) 604 may be embodied in any physical hardware, such as the computing device 700 of FIG. 7.

The one or more user devices 602 are communicatively coupled to the server(s) 604 via the one or more networks 618. In practice, the connection may be any viable data transport network, such as, for example, a LAN or WAN. Network(s) 618 can be for example, a local area network (LAN), a wide area network (WAN) such as the Internet, or a combination of the two, and include wired, wireless, or fiber optic connections. In general, network(s) 518 can be any combination of connections and protocols that will support communications between the control server(s) 604 and the user devices 602.

In some embodiments, a user issues a query (e.g., the query input into the field 411 of FIG. 4A) on the one or more user devices 602, after which the user device(s) 602 communicate, via the network(s) 618, to the one or more servers 604 and the one or more servers 604 executes the query (e.g., via one or more components of FIG. 1) and causes or provides for display one or more search result candidates back to the user device(s) 602 (e.g., via the presentation component 112). For example, with respect to FIGS. 4A and 4B, the screenshots 400 and 400-1 may be an example of what is displayed to the user device(s) 602 when the one or more servers 604 execute the query and causes search result to be displayed to the user device(s) 702.

The invention may be described in the general context of computer code or machine-useable instructions, including computer-executable instructions such as program modules, being executed by a computer (or one or more processors) or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
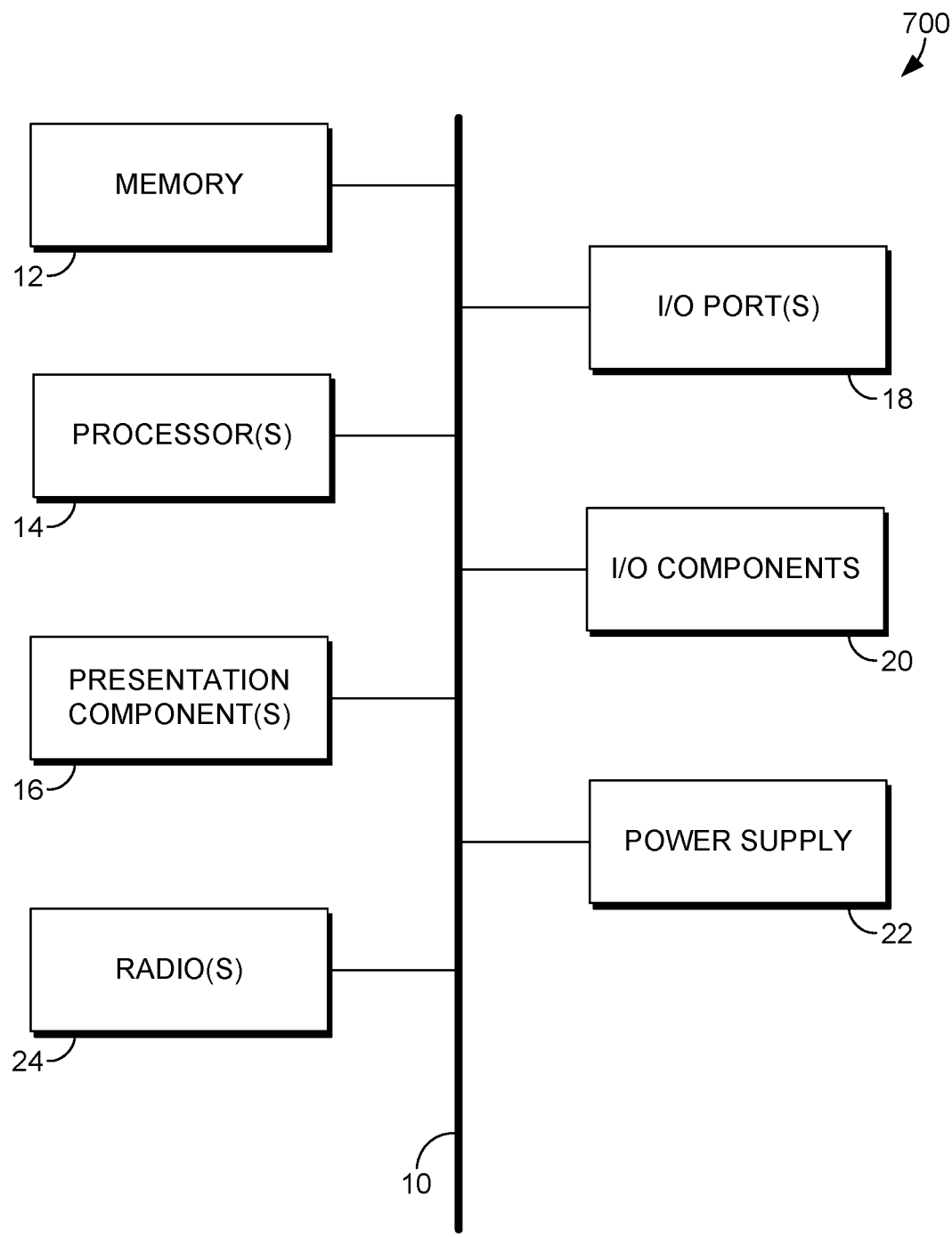
FIG. 7 is a block diagram of a computing device in which aspects of the present disclosure are implemented within, according to particular embodiments.

With reference to FIG. 7, computing device 700 includes bus 10 that directly or indirectly couples the following devices: memory 12, one or more processors 14, one or more presentation components 16, input/output (I/O) ports 18, input/output components 20, and illustrative power supply 22. Bus 10 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that this diagram is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

In some embodiments, the computing device 700 represents the physical embodiments of one or more systems and/or components described above. For example, the computing device 700 can be the one or more user devices 602 and/or the server(s) 604 of FIG. 6. The computing device 700 can also perform some or each of the blocks in the process 500 and or any functionality described herein with respect to FIGS. 1-6. It is understood that the computing device 700 is not to be construed necessarily as a generic computer that performs generic functions. Rather, the computing device 700 in some embodiments is a particular machine or special-purpose computer. For example, in some embodiments, the computing device 600 is or includes: a multi-user mainframe computer system, one or more cloud computing nodes, a single-user system, or a server computer or similar device that has little or no direct user interface, but receives requests from other computer systems (clients), a desktop computer, portable computer, laptop or notebook computer, tablet computer, pocket computer, telephone, smart phone, smart watch, or any other suitable type of electronic device.

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 14 that read data from various entities such as memory 12 or I/O components 20. Presentation component(s) 16 present data indications to a user or other device. Exemplary presentation components include a display device, speaker, printing component, vibrating component, etc.

I/O ports 18 allow computing device 700 to be logically coupled to other devices including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

As described above, implementations of the present disclosure relate to automatically generating a user interface or rendering one or more applications based on contextual data received about a particular user. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" or "component" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

The terms first (e.g., first cache), second (e.g., second cache), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, a server computing device may "cause" a message to be displayed to a user device (e.g., via transmitting a message to the user device) and/or the same user device may "cause" the same message to be displayed (e.g., via a processor that executes instructions and data in a display memory of the user device). Accordingly, one or both systems may in isolation or together "cause" the effect of displaying a message.

What is claimed is:

1. A computerized system comprising:
   one or more processors; and
   computer storage memory having computer-executable instructions stored thereon which, when executed by the one or more processors, implement a method comprising:
   receiving a first listing and a second listing, each listing describes a same type of item for sale in an electronic marketplace;
   computing, via at least an arithmetic logic unit (ALU) of the one or more processors, a first quantity of clicks of a first variant of a first listing and a second quantity of clicks of a second variant of the first listing, the first variant of the first listing and the second variant of the first listing representing different attributes of the first listing;
   computing, via the ALU of the one or more processors, a third quantity of clicks of a third variant of a second listing and a fourth quantity of clicks of a fourth variant of the second listing, the third variant of the second listing and the fourth variant of the second listing representing different attributes of second listing;
   determining that the first variant of the first listing and the third variant of the second listing correspond to a matching attribute that share a same value, wherein the matching attribute includes one of: a same size of the item, a same color of the item, or a same price of the item;
   receiving, at a search engine, a first query describing the matching attribute;
   ranking the first listing higher than the second listing based only on: the first query describing the matching attribute and the first quantity of clicks of the first variant of the first listing being higher than the third quantity of clicks of the third variant of the second listing, wherein the ranking is not based on the second quantity of clicks of the second variant of the first listing and the fourth quantity of clicks of the fourth variant of the second listing;
   receiving a third listing that lacks any variant; and
   based on determining that the third listing lacks any variant and determining that the first listing includes the first variant and the second variant and the second listing includes the third variant and the fourth variant, ranking the third listing below the first listing and the second listing by at least decaying the third listing.

2. The system of claim 1, wherein the first listing is presented in response to the first query being issued and wherein the second listing is presented in response to a second query being issued that is different than the first query.

3. The system of claim 1, the method further comprising:
   updating a data structure associated with the second variant such that the third quantity of clicks are now higher than the first quantity of clicks;
   receiving another query associated with the item; and
   based at least in part on the updating of the data structure, rank the second listing higher relative to the ranking of the second listing prior to the updating.

4. The system of claim 1, wherein the first listing includes a unique identifier that indicates that there are multiple iterations of the first listing and refers to a specific stock item in a seller's inventory or product catalog, wherein the first variant and the second variant have a same unique identifier as the first listing.

5. The system of claim 1, wherein the computing of the first quantity of clicks and the third quantity of clicks is based on:
copying, by the one or more processors, activity data from a variant activity log to a first data structure and activity data from a listing activity log to a second data structure, the first data structure associating each variant with a listing identifier of the first listing and the second data structure referencing the first data structure; and
computing, by the one or more processors, the first and third quantities of clicks within a predefined time window, wherein the time window is defined by a window component and applied to the copied activity data in the first and second data structures.

6. The computerized system of claim 1, wherein the computing of the third quantity of clicks further comprises deleting, by the one or more processors, one or more click counts associated with the third variant of the second listing based at least in part on the second listing corresponding to an expired listing.

7. The computerized system of claim 6, wherein the second listing is determined to be expired based on an indication that a seller associated with the second listing has sold an item corresponding to the second listing.

8. A computer-implemented method comprising:
receiving a first listing and a second listing, each listing describes a same type of item for sale in an electronic marketplace;
computing, via at least an arithmetic logic unit (ALU) of the one or more processors, a first quantity of clicks of a first variant of a first listing and a second quantity of clicks of a second variant of the first listing, the first variant of the first listing and the second variant of the first listing representing different attributes of the first listing;
computing, via the ALU of the one or more processors, a third quantity of clicks of a third variant of a second listing and a fourth quantity of clicks of a fourth variant of the second listing, the third variant of the second listing and the fourth variant of the second listing representing different attributes of second listing;
determining that the first variant of the first listing and the third variant of the second listing correspond to a matching attribute that share a same value, wherein the matching attribute includes one of: a same size of the item, a same color of the item, or a same price of the item;
receiving, at a search engine, a first query describing the matching attribute;
ranking the first listing higher than the second listing based only on: the first query describing the matching attribute and the first quantity of clicks of the first variant of the first listing being higher than the third quantity of clicks of the third variant of the second listing, wherein the ranking is not based on the second quantity of clicks of the second variant of the first listing and the fourth quantity of clicks of the fourth variant of the second listing;
receiving a third listing that lacks any variant; and
based on determining that the third listing lacks any variant and determining that the first listing includes the first variant and the second variant and the second listing includes the third variant and the fourth variant, ranking the third listing below the first listing and the second listing by at least decaying the third listing.

9. The computer-implemented method of claim 8, wherein the first listing is presented in response to the first query being issued and wherein the second listing is presented in response to a second query being issued that is different than the first query.

10. The computer-implemented method of claim 8, further comprising:
updating a data structure associated with the second variant such that the third quantity of clicks are now higher than the first quantity of clicks;
receiving another query associated with the item; and
based at least in part on the updating of the data structure, rank the second listing higher relative to the ranking of the second listing prior to the updating.

11. The computer-implemented method of claim 8, wherein the first listing includes a unique identifier that indicates that there are multiple iterations of the first listing and refers to a specific stock item in a seller's inventory or product catalog, wherein the first variant and the second variant have a same unique identifier as the first listing.

12. The computer-implemented method of claim 8, wherein the computing of the first quantity of clicks and the third quantity of clicks is based on:
copying, by the one or more processors, activity data from a variant activity log to a first data structure and activity data from a listing activity log to a second data structure, the first data structure associating each variant with a listing identifier of the first listing and the second data structure referencing the first data structure; and
computing, by the one or more processors, the first and third quantities of clicks within a predefined time window, wherein the time window is defined by a window component and applied to the copied activity data in the first and second data structures.

13. The computer-implemented method of claim 8, wherein the computing of the third quantity of clicks further comprises deleting, by the one or more processors, one or more click counts associated with the third variant of the second listing based at least in part on the second listing corresponding to an expired listing.

14. The computer-implemented method of claim 13, wherein the second listing is determined to be expired based on an indication that a seller associated with the second listing has sold an item corresponding to the second listing.

15. One or more computer storage media having computer-executable instructions embodied thereon that, when executed, by one or more processors, cause the one or more processors to perform a method, the method comprising:
receiving a first listing and a second listing, each listing describes a same type of item for sale in an electronic marketplace;
computing, via at least an arithmetic logic unit (ALU) of the one or more processors, a first quantity of clicks of a first variant of a first listing and a second quantity of clicks of a second variant of the first listing, the first variant of the first listing and the second variant of the first listing representing different attributes of the first listing;
computing, via the ALU of the one or more processors, a third quantity of clicks of a third variant of a second listing and a fourth quantity of clicks of a fourth variant of the second listing, the third variant of the second listing and the fourth variant of the second listing representing different attributes of second listing;

determining that the first variant of the first listing and the third variant of the second listing correspond to a matching attribute that share a same value, wherein the matching attribute includes one of: a same size of the item, a same color of the item, or a same price of the item;

receiving, at a search engine, a first query describing the matching attribute;

ranking the first listing higher than the second listing based only on: the first query describing the matching attribute and the first quantity of clicks of the first variant of the first listing being higher than the third quantity of clicks of the third variant of the second listing, wherein the ranking is not based on the second quantity of clicks of the second variant of the first listing and the fourth quantity of clicks of the fourth variant of the second listing;

receiving a third listing that lacks any variant; and based on determining that the third listing lacks any variant and determining that the first listing includes the first variant and the second variant and the second listing includes the third variant and the fourth variant, ranking the third listing below the first listing and the second listing by at least decaying the third listing.

16. The one or more computer storage media of claim 15, wherein the first listing is presented in response to the first query being issued and wherein the second listing is presented in response to a second query being issued that is different than the first query.

17. The one or more computer storage media of claim 15, the method further comprising:
updating a data structure associated with the second variant such that the third quantity of clicks are now higher than the first quantity of clicks;
receiving another query associated with the item; and
based at least in part on the updating of the data structure, rank the second listing higher relative to the ranking of the second listing prior to the updating.

18. The one or more computer storage media of claim 15, wherein the first listing includes a unique identifier that indicates that there are multiple iterations of the first listing and refers to a specific stock item in a seller's inventory or product catalog, wherein the first variant and the second variant have a same unique identifier as the first listing.

19. The one or more computer storage media of claim 15, wherein the computing of the first quantity of clicks and the third quantity of clicks is based on:
copying, by the one or more processors, activity data from a variant activity log to a first data structure and activity data from a listing activity log to a second data structure, the first data structure associating each variant with a listing identifier of the first listing and the second data structure referencing the first data structure; and
computing, by the one or more processors, the first and third quantities of clicks within a predefined time window, wherein the time window is defined by a window component and applied to the copied activity data in the first and second data structures.

20. The one or more computer storage media of claim 15, wherein the computing of the third quantity of clicks further comprises deleting, by the one or more processors, one or more click counts associated with the third variant of the second listing based at least in part on the second listing corresponding to an expired listing.

21. The one or more computer storage media of claim 20, wherein the second listing is determined to be expired based on an indication that a seller associated with the second listing has sold an item corresponding to the second listing.

* * * * *